(12) United States Patent
Bates et al.

(10) Patent No.: US 7,995,444 B2
(45) Date of Patent: Aug. 9, 2011

(54) APPARATUS AND METHOD TO STORE AND RETRIEVE INFORMATION USING AN OPTICAL HOLOGRAPHIC DATA STORAGE MEDIUM

(75) Inventors: Allen Keith Bates, Tucson, AZ (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 714 days.

(21) Appl. No.: 12/030,088

(22) Filed: Feb. 12, 2008

(65) Prior Publication Data

US 2009/0201784 A1 Aug. 13, 2009

(51) Int. Cl.
*G11B 7/00* (2006.01)
(52) U.S. Cl. ........................................................ 369/103
(58) Field of Classification Search .................... 369/103
See application file for complete search history.

(56) References Cited

U.S. PATENT DOCUMENTS

| | | | |
|---|---|---|---|
| 5,675,570 | A | 10/1997 | Ohira et al. |
| 6,625,100 | B2 | 9/2003 | Edwards |
| 6,738,322 | B2 | 5/2004 | Amble et al. |
| 6,850,345 | B2 | 2/2005 | Edwards et al. |
| 7,724,631 | B2 * | 5/2010 | Bates et al. ................... 369/103 |
| 2004/0001400 | A1 | 1/2004 | Amble et al. |
| 2005/0243699 | A1 | 11/2005 | Noda et al. |
| 2006/0109774 | A1 | 5/2006 | Horimai et al. |
| 2006/0181999 | A1 * | 8/2006 | Knittel et al. ................. 369/103 |
| 2006/0232841 | A1 * | 10/2006 | Toishi et al. .................... 359/24 |
| 2006/0233087 | A1 * | 10/2006 | Usami ........................... 369/103 |
| 2007/0054195 | A1 * | 3/2007 | Usami .............................. 430/2 |
| 2007/0140091 | A1 * | 6/2007 | Lin et al. ....................... 369/103 |
| 2008/0316896 | A1 * | 12/2008 | Usami ........................... 369/103 |

OTHER PUBLICATIONS

Hampshire, "Holographic storage: Virtual reality?", ZDNet UK, Nov. 15, 2005.

* cited by examiner

*Primary Examiner* — Adam R Giesy
(74) *Attorney, Agent, or Firm* — Dale F. Regelman; Quarles & Brady LLP

(57) ABSTRACT

A method using an optical holographic data storage medium and an optical holographic data storage drive, comprising removeably disposing the optical holographic data storage medium in the optical holographic data storage drive, and determining whether to write information to the holographic data storage layer, and/or whether to read information from the holographic data storage layer, and/or whether to write information to the optical data storage layer, and/or whether to read information from the optical data storage layer. The optical holographic data storage medium comprises a holographic data storage layer and an optical data storage layer. The optical holographic data storage drive comprises a reflective spatial light modulator, a first lasing device, a first optical detector for detecting first laser light, a second lasing device, and a second optical detector for detecting second laser light.

15 Claims, 15 Drawing Sheets

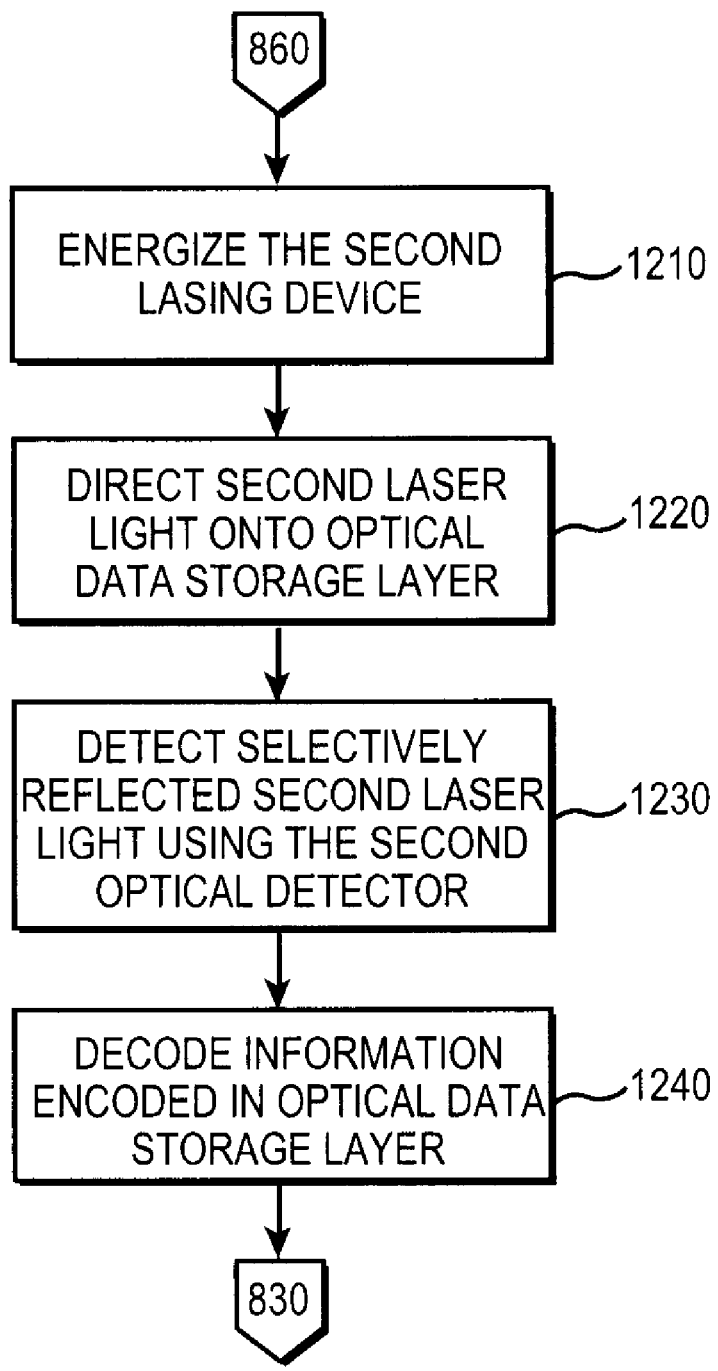

US 7,995,444 B2

APPARATUS AND METHOD TO STORE AND RETRIEVE INFORMATION USING AN OPTICAL HOLOGRAPHIC DATA STORAGE MEDIUM

FIELD OF THE INVENTION

This invention relates to an apparatus and method to store and retrieve information using an optical holographic data storage medium.

BACKGROUND OF THE INVENTION

In holographic information storage, an entire page of information is stored at once as an interference pattern within a thick, photosensitive material comprising a holographic data storage layer. This is done by intersecting two coherent laser beams within the storage layer. The first, called the data beam, contains the information to be stored; the second, called the reference beam, is designed to be simple to reproduce, for example a simple collimated beam with a planar wavefront.

The resulting interference pattern causes chemical and/or physical changes in the photosensitive medium: a replica of the interference pattern is stored as a change in the absorption, refractive index, or thickness of the photosensitive medium.

When the stored interference pattern is illuminated with one of the two waves that were used during recording, some of this incident light is diffracted by the stored interference pattern in such a fashion that the other wave is reconstructed. Illuminating the stored interference pattern with the reference wave reconstructs the data beam, and vice versa.

Optical drives, including CD and DVD drives, detect variations in the optical properties in the surface of an optical data storage layer. Such optical drives direct a light beam onto that surface and detect either the presence or absence of a corresponding reflected beam.

SUMMARY OF THE INVENTION

The invention comprises an optical holographic data storage medium comprising a holographic data storage layer and a separate optical data storage layer. The invention further comprises an optical holographic data storage drive comprising a reflective spatial light modulator, a first lasing device for emitting first laser light comprising a first wavelength, a first optical detector for detecting first laser light, a second lasing device for emitting second laser light comprising a first power and a second wavelength and third laser light comprising a second power and the second wavelength, and a second optical detector for detecting second laser light.

The invention further comprises a method using Applicants' optical holographic data storage medium and Applicants' optical holographic data storage drive The method removeably disposes Applicants' optical holographic data storage medium in Applicants' optical holographic data storage drive, and determines whether to write information to the holographic data storage layer, and/or whether to read information from the holographic data storage layer, and/or whether to write information to the optical data storage layer, and/or whether to read information from the optical data storage layer.

BRIEF DESCRIPTION OF THE DRAWINGS

The invention will be better understood from a reading of the following detailed description taken in conjunction with the drawings in which like reference designators are used to designate like elements, and in which:

FIG. 12 is a flow chart summarizing additional steps of Applicants' method.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
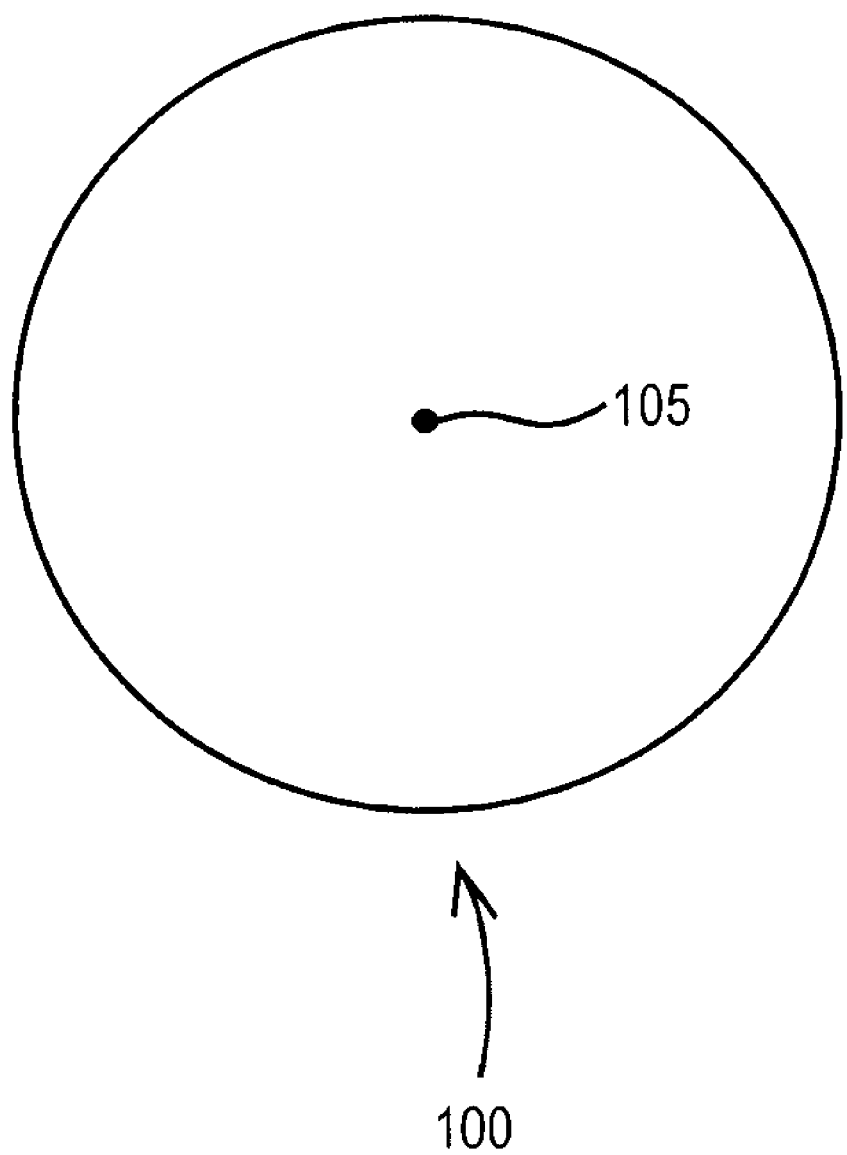
FIG. 1 is top view of Applicants' optical and holographic data storage medium.
Figure 2A:
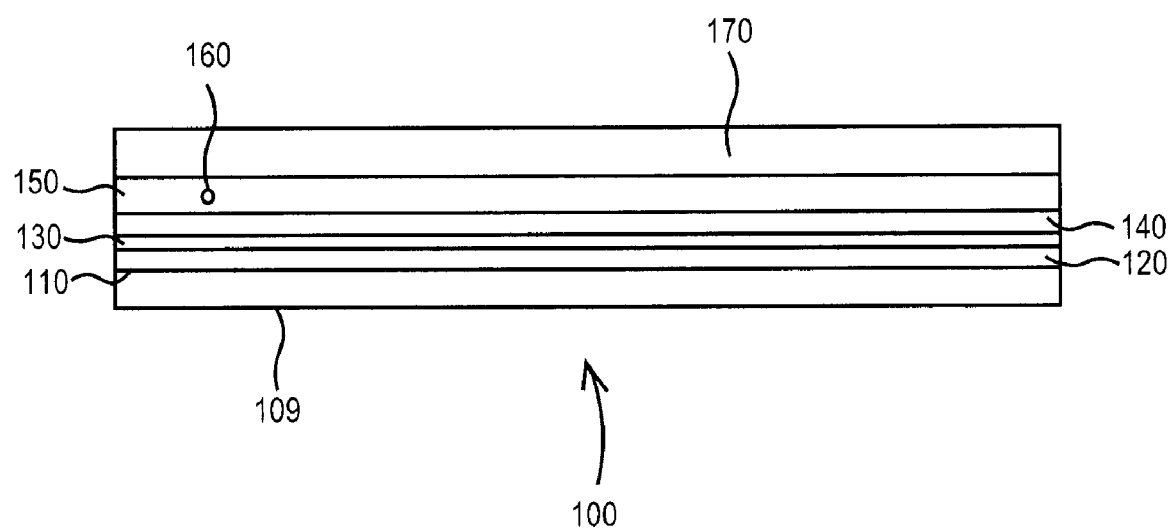
FIG. 2A is a cross-sectional view of one embodiment of the optical and holographic data storage medium of FIG. 1.

FIG. 1 illustrates optical and holographic data storage medium 100 (FIGS. 1, 2A, 2B, 3, 4, 5A, 5B, 6) comprising geometric center-of-disk 105. Referring now to FIG. 2A, in certain embodiments, Applicants' optical holographic data storage medium 100 comprises optical data storage layer 110. In certain embodiments, optical data storage layer 110 comprises pit regions and non-pit regions formed therein during manufacture. Such pit regions do not reflect incident laser light. The absence of reflected laser light is decoded to mean a "0" for data storage purposes.

Non-pit regions do reflect incident laser light. Detection of such reflected laser light is decoded to mean a "1" for data storage purposes. In certain embodiments, an optical data storage layer comprising a combination of pit regions and non-pit regions comprises read only memory ("ROM"), such as for example and without limitation a CD-ROM, DVD-ROM, HD-DVD-ROM, BD-ROM, and the like.

In the illustrated embodiment of FIG. 2A, Applicants' optical holographic data storage medium 100 (FIGS. 1, 2A, 2B, 3, 4, 5A, 5B, 6) further comprises gap layer 120 disposed over optical data storage layer 110. In the illustrated embodiment of FIG. 2A, Applicants' optical holographic data storage medium 100 further comprises dichronic mirror 130 (FIGS. 2A, 2B) disposed over gap layer 120. Applicants' dichronic mirror 130 reflects light comprising certain wavelengths, but transmits light having other wavelengths. More specifically, dichronic mirror 130 reflects the laser light emitted by first lasing device 405 (FIGS. 3, 4, 5A, 5B, 6) but does not reflect the laser light emitted by second lasing device 480 (FIGS. 3, 4, 5A, 5B, 6).

By "reflects the laser light" or "is reflected by," Applicants mean that less than about 10 percent of the laser light incident on Applicants' dichronic mirror is transmitted through that dichronic mirror. By "does not reflect the laser light" or "is not reflected by," Applicants mean that more than about 90 percent of the laser light incident on Applicants' dichronic mirror is transmitted through that dichronic mirror.

In the illustrated embodiment of FIG. 2A, Applicants' optical holographic data storage medium 100 (FIGS. 1, 2A, 2B, 3, 4, 5A, 5B, 6) further comprises gap layer 140 disposed over dichronic mirror 130. In the illustrated embodiment of FIG. 2A, Applicants' optical holographic data storage medium 100 further comprises holographic data storage layer 150 disposed over gap layer 140. In the illustrated embodiment of FIG. 2A, Applicants' optical holographic data storage medium 100 further comprises cover layer 170 disposed over holographic data storage layer 150 and substrate 109 under optical data storage layer 110. The illustrated embodiment of FIG. 2A shows hologram 160 (FIGS. 2A, 2B, 3, 4, 5) encoded as an interference pattern within holographic data storage layer 150.

Figure 2B:
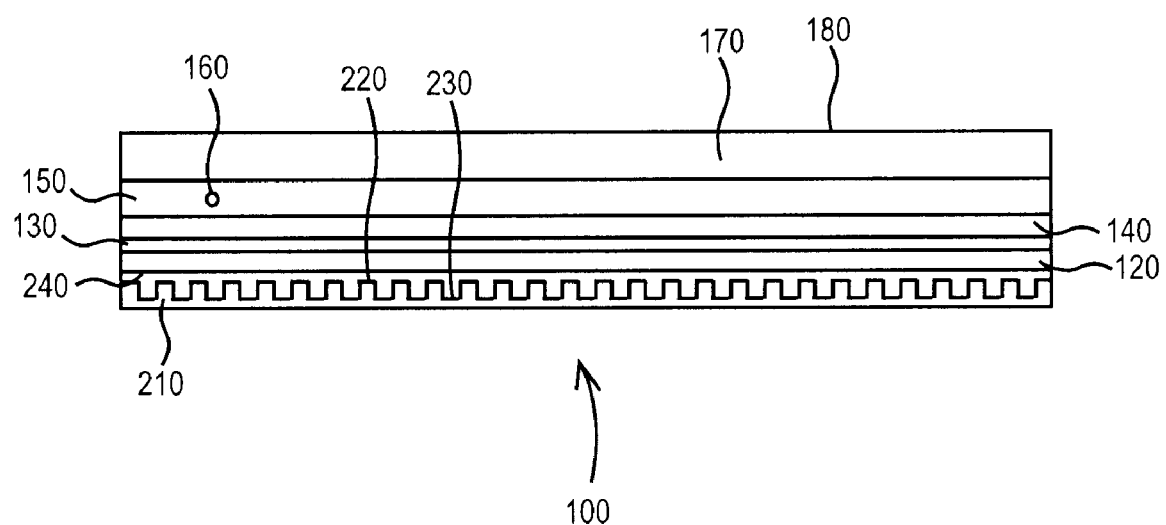
FIG. 2B is a cross-sectional view of a second embodiment of the optical and holographic data storage medium of FIG. 1.

Referring now to FIG. 2B, in certain embodiments which is a radial cross-section of Applicants' optical holographic data storage medium 100 (FIGS. 1, 2A, 2B, 3, 4, 5A, 5B, 6) comprises tracking assembly 210 which comprises series of alternating lands 220 and grooves 230, wherein a writeable or re-writeable layer 240 is disposed over the alternating lands and grooves. The alternating lands and grooves are used for tracking purposes when writing data to writeable/re-writeable layer 240 and/or holographic data storage layer 150.

In the illustrated embodiment of FIG. 2B, Applicants' optical holographic data storage medium 100 further comprises gap layer 120 disposed over writeable/re-writeable layer 240. In the illustrated embodiment of FIG. 2B, Applicants' optical holographic data storage medium 100 further comprises dichronic mirror 130 disposed over gap layer 120.

In the illustrated embodiment of FIG. 2B, Applicants' optical holographic data storage medium 100 (FIGS. 1, 2A, 2B, 3, 4, 5A, 5B, 6) further comprises gap layer 140 disposed over dichronic mirror 130, holographic data storage layer 150 disposed over gap layer 140, and cover layer 170 disposed over holographic data storage layer 150. The illustrated embodiment of FIG. 2B shows hologram 160 (FIGS. 2A, 2B, 3, 4, 5) encoded as an interference pattern within holographic data storage layer 150. Outer surface 180 of cover layer 170 may be treated with diamond-like-carbon for increased wear resistance and increased scratch resistance.

Figure 2C:
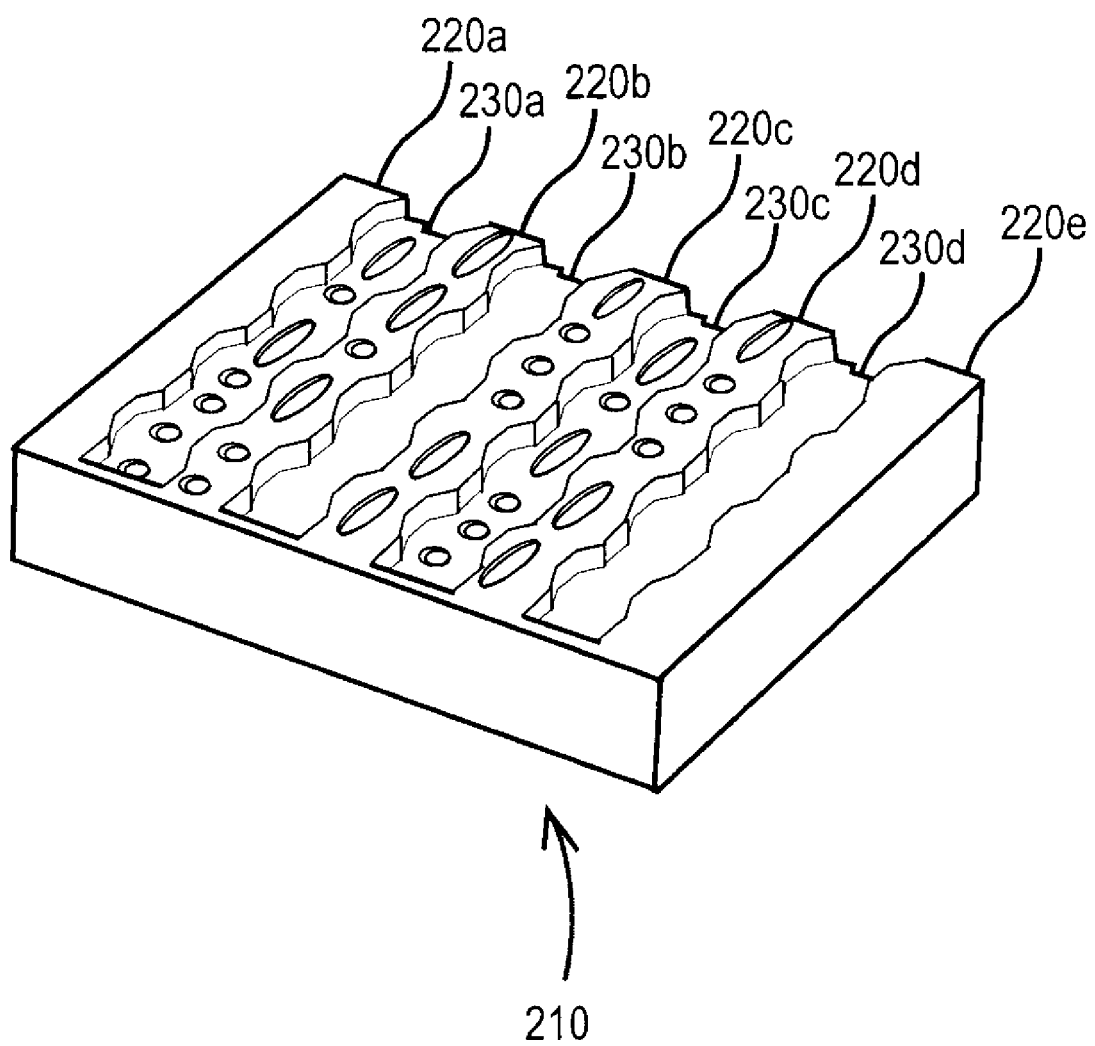
FIG. 2C is a perspective view of a series of alternating lands and grooves disposed in certain embodiments of the optical and holographic data storage medium of FIG. 2B.

Referring now to FIG. 2C, in certain embodiments the tracking assembly 210 comprises a series of "wobbly" lands and grooves, such as lands 220a, 220b, 220c, 220d, and 220e. Those "wobbly" lands are separated by "wobbly" grooves 230a, 230b, 230c, and 230d, respectively.

Figure 3:
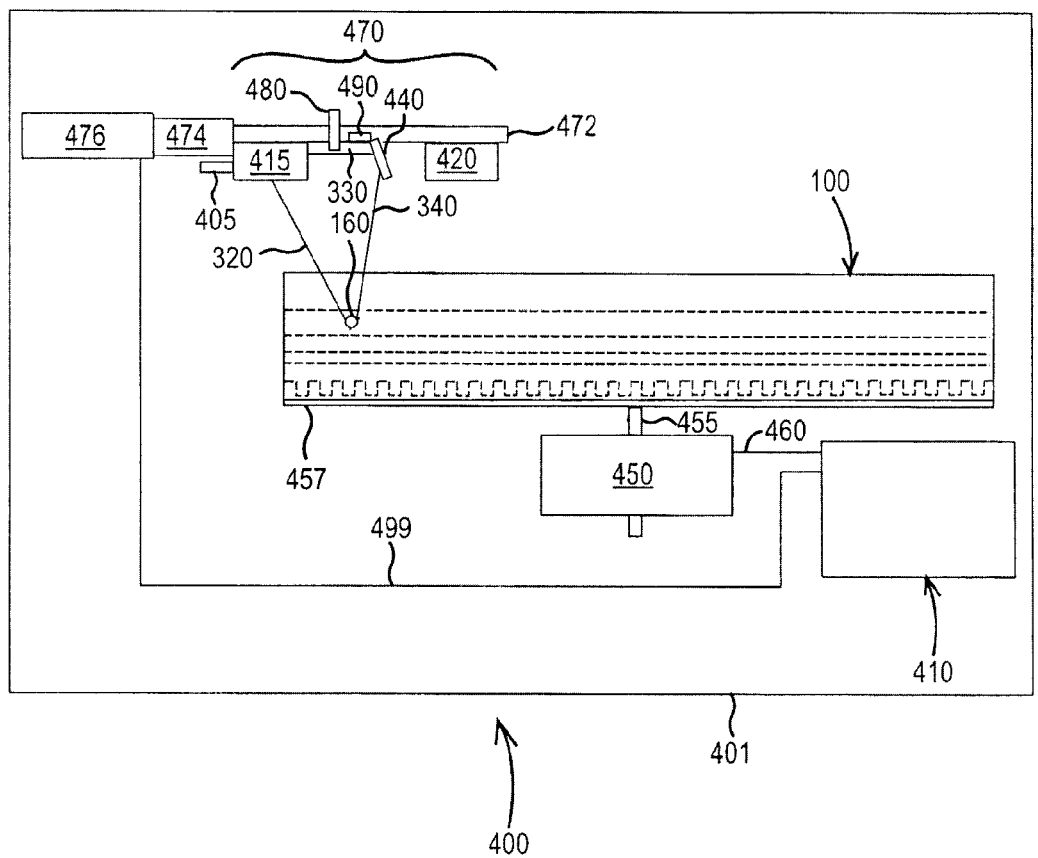
FIG. 3 is a block diagram showing Applicants' optical and holographic drive, wherein an optical head is shown using a first lasing device to encode a hologram into the holographic data storage layer of Applicants' optical and holographic data storage medium.

Referring now to FIG. 3, optical holographic data drive 400 (FIGS. 3, 4, 5A, 5B, 7) comprises housing 401, first lasing device 405 (FIGS. 3, 4, 5A, 5B, 6), beam splitter 415 (FIGS. 3, 4, 5A, 5B, 6), reflective spatial light modulator 440 (FIGS. 3, 4, 5A, 5B, 6), and optical sensor 420 (FIGS. 3, 4, 5A, 5B, 6). Optical holographic data storage medium 100 (FIGS. 1, 2A, 2B, 3, 4, 5A, 5B, 6) can be removeably disposed within housing 401. In the illustrated embodiment of FIG. 3, optical holographic data storage medium 100 is releaseably attached to a drive mechanism comprising drive motor 450 and rotatable shaft 455. Drive motor 450 rotates rotatable shaft 455 thereby causing platen 457 to rotate. Optical holographic data storage medium 100 rides on platen 457.

In certain embodiments, reflective spatial light modulator 440 comprises an assembly comprising a plurality of micro mirrors. In other embodiments, reflective spatial light modulator 440 comprises a liquid crystal on silicon ("LCOS") display device. In contrast to nematic twisted liquid crystals used in LCDs, in which the crystals and electrodes are sandwiched between polarized glass plates, LCOS devices have the liquid crystals coated over the surface of a silicon chip. The electronic circuits that drive the formation of the image are etched into the chip, which is coated with a reflective (aluminized) surface. The polarizers are located in the light path both before and after the light bounces off the chip. LCOS devices are easier to manufacture than conventional LCD displays. LCOS devices have higher resolution because several million pixels can be etched onto one chip. LCOS devices can be much smaller than conventional LCD displays.

In the illustrated embodiment of FIG. 3, optical holographic data drive 400 (FIGS. 3, 4, 5A, 5B, 7) further comprises member 472 slidably disposed within member 474, which is slidably disposed within optical head motor 476. Drive controller 410 (FIGS. 3, 4, 5A, 5B, 6) can cause optical head motor 476 to extend members 474 and 472 outwardly. In the illustrated embodiment of 3, first lasing device 405 (FIGS. 3, 4, 5A, 5B, 6), beam splitter 415 (FIGS. 3, 4, 5A, 5B, 6), optical sensor 420 (FIGS. 4A, 4B, 5, 6A, 6B), reflective spatial light modulator 440 (FIGS. 3, 4, 5A, 5B, 6), second lasing device 480 (FIGS. 3, 4, 5A, 5B, 6), and optical sensor 490 (FIGS. 3, 4, 5A, 5B, 6), are disposed on member 472. Member 472 in combination with beam splitter 415, reflective spatial light modulator 440, first lasing device 405, second lasing device 480, optical sensor 490, and optical sensor 420, comprise optical head 470 (FIGS. 3, 4, 5A, 5B, 6).

In certain embodiments, first lasing device 405 emits blue laser light. In certain embodiments, first lasing device 405 comprises a gallium nitride laser and emits blue laser light having a wavelength of about 473 nm. In certain embodiments, first laser device 405 emits blue laser light having a wavelength of about 405 nm.

In certain embodiments, second lasing device 480 (FIGS. 3, 4, 5A, 5B, 6) emits red laser light. In certain embodiments, second lasing device 480 (FIGS. 3, 4, 5A, 5B, 6) comprises an AlGaInP laser which emits light having a wavelength between about 620-690 nm.

In the illustrated embodiment of FIG. 3, optical holographic data drive 400 (FIGS. 3, 4, 5A, 5B, 7) further comprises drive controller 410 (FIGS. 3, 4, 5A, 5B, 6) which communicates with drive motor 450 via control line 460 and optical head motor 476 via control line 499. In the illustrated embodiment of FIG. 6, drive controller 410 comprises integrated circuit 610 in communication with optical head 470 (FIGS. 3, 4, 5A, 5B, 6) and with processor module 620, wherein processor module 620 comprises digital signal processor 622 and microprocessor 624. Drive controller 410 further comprises focusing servo 630, focusing actuator 640, first tracking servo 650, second tracking servo 660, tracking actuator 670, and drive motor servo 680. In certain embodiments, first tracking servo 650 comprises a read-only optical data storage layer tracking servo. In certain embodiments, second tracking servo 660 comprises a writeable optical data storage layer tracking servo.

FIG. 3 shows optical holographic data drive 400 (FIGS. 3, 4, 5A, 5B, 7) being used to encode a hologram as interference pattern 160 (FIGS. 2A, 2B, 3, 4, 5) in optical holographic data storage medium 100 (FIGS. 1, 2A, 2B, 3, 4, 5A, 5B, 6). The light generated by first lasing device 405 is split by beam splitter 415 into reference beam 320, and carrier beam 330.

An image comprising information is displayed on reflective spatial light modulator (RSLM) 440. Carrier beam 330 is directed onto, and is reflected from, RSLM 440 to form reflected data beam 340 comprising the image. Reference beam 320 interferes with data beam 340 to form a hologram. That hologram is encoded in optical holographic data storage medium 100 (FIGS. 1, 2A, 2B, 3, 4, 5A, 5B, 6) as an interference pattern 160 (FIGS. 2A, 2B, 3, 4, 5). That optical interference pattern causes chemical and/or physical changes in the photosensitive medium. The interference pattern is encoded within holographic data storage layer 150 (FIGS. 2A, 2B) as a change in the absorption, refractive index, and/or thickness of the photosensitive medium.

Figure 4:
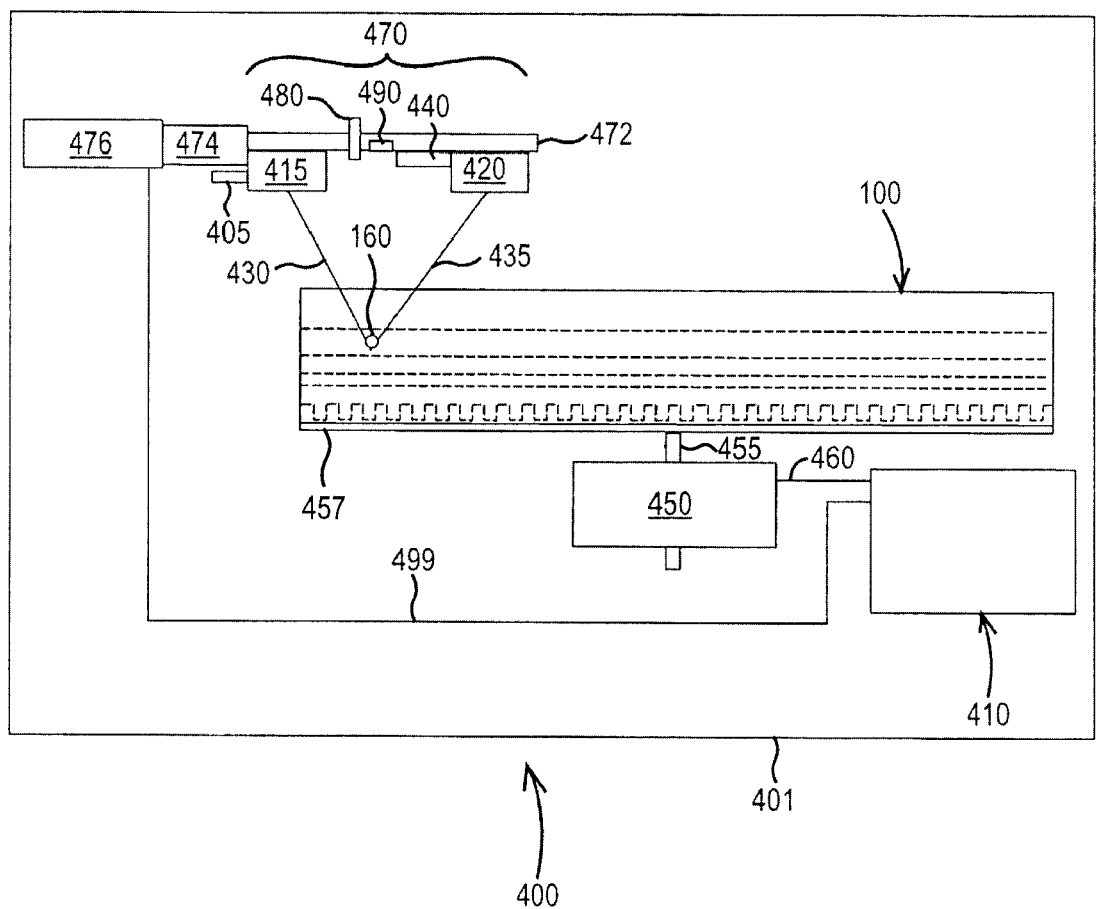
FIG. 4 is a block diagram showing the optical head element of Applicants' optical and holographic drive using the first lasing device to decode an image encoded as a hologram in Applicants' optical and holographic data storage medium.

FIG. 4 shows optical holographic data drive 400 (FIGS. 3, 4, 5A, 5B, 7) being used to decode interference pattern 160. To decode interference pattern 160, reference beam 430 is incident on the encoded holographic data storage layer 150 (FIGS. 2A, 2B). As the reference beam 430 interacts with interference pattern 160, a reconstructed data beam 435 is generated, wherein that reconstructed data beam 435 comprises a reconstructed image similar to the original image displayed on RSLM 440.

Figure 7:
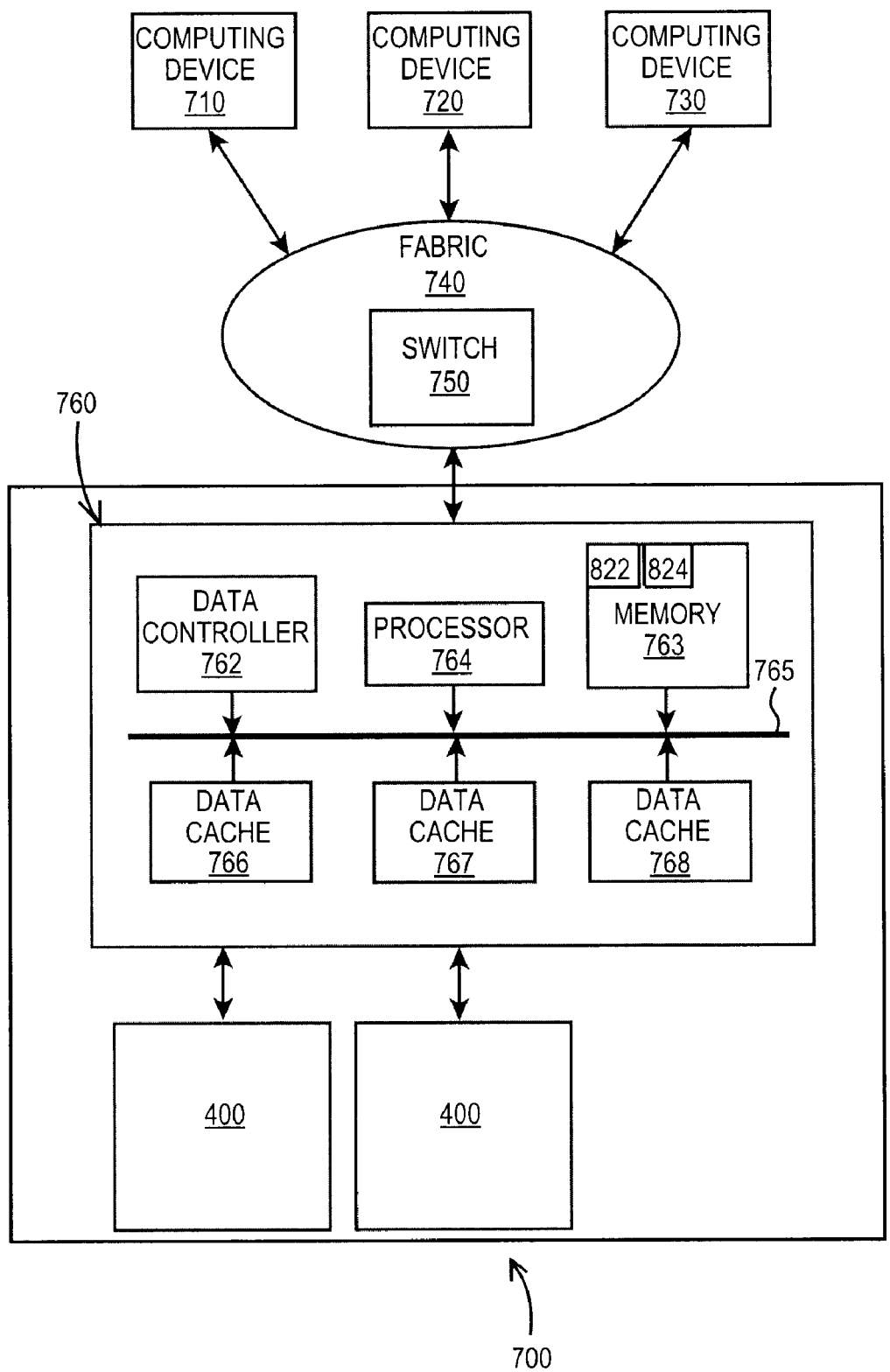
FIG. 7 is a block diagram showing one embodiment of Applicants' data storage and retrieval system.

Reconstructed data beam 435 is projected onto optical sensor 420. Optical sensor 420 comprises a plurality of detector elements. Optical sensor 420 digitally captures the information comprising the reconstructed image of the reconstructed data beam 435, and provides that information to drive controller 410. In certain embodiments, drive controller 410 provides the information to a storage controller, such as for example storage controller 760 (FIG. 7).

Figure 5A:
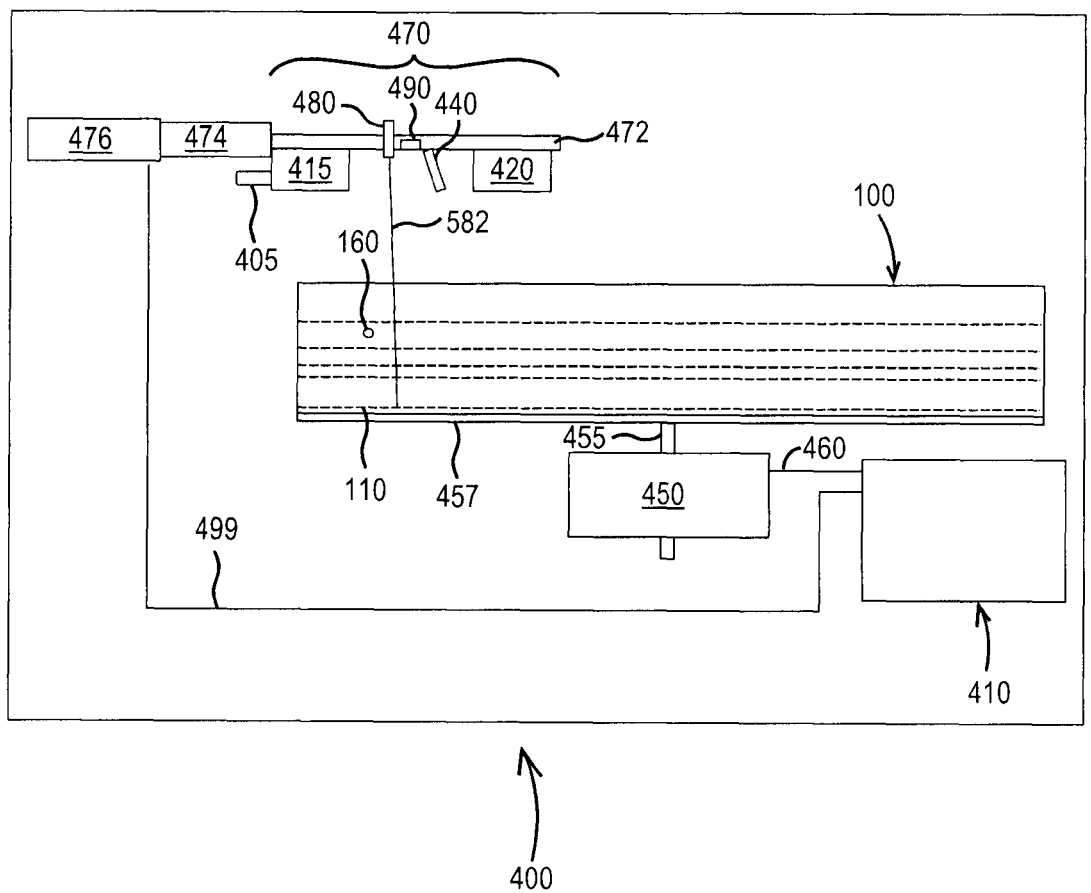
FIG. 5A is a block diagram showing the optical head of FIG. 3 using a second lasing device to write information to the optical data storage layer of Applicants' optical and holographic data storage medium.

Referring now to FIG. 5A, Applicants' optical holographic data drive 400 (FIGS. 3, 4, 5A, 5B, 7) utilizes second lasing device 480 and second laser light 582 to write information to optical data storage layer 110 (FIG. 2A) or 240 (FIG. 2B). Dichronic mirror layer 130 (FIGS. 2A, 2B) is transparent to the second laser light 582 provided by second lasing device 480, and that second laser light 582 passes through dichronic mirror layer 130 and strikes optical data storage layer 110 (FIG. 2A) or 240 (FIG. 2B). Drive controller 410 (FIGS. 3, 4, 5A, 5B, 6) causes optical head 470 to move along one or more of the three orthogonal axes, and as optical head 470 moves the second laser light 582 incident on optical data storage layer 110 (FIG. 2A). The three orthogonal axes are typically radial, tangential, and vertical, and comprise a cylindrical coordinate system (R, θ, Z).

As those skilled in the art will appreciate, different technologies exist to write information to the optical data storage layer 110 (FIG. 2A)/240 (FIG. 2B) disposed in the optical holographic data storage medium of step 810. In certain embodiments, optical data storage layer 110 (FIG. 2A)/240 (FIG. 2B) comprises an organic dye that darkens when exposed to second laser light 582. The darkening is permanent. The writing process is similar to photography. This darkened portion absorbs light when read rather than reflecting it.

In certain embodiments, second lasing device 480 ablates the surface of optical data storage layer 110 (FIG. 2A)/240 (FIG. 2B) to form darkened pits on the shiny substrate. The ablation is irreparable.

In certain embodiments, Applicants' optical holographic data storage medium 100 comprises a ferrous layer disposed under optical data storage layer 110 (FIG. 2A)/240 (FIG. 2B). When writing information, laser light 582 heats optical data storage layer 110 (FIG. 2A)/240 (FIG. 2B) while a magnet under platen 457 (FIGS. 3, 4, 5A, 5B) simultaneously attracts the ferrous layer. This change in magnetic polarity creates what is sometimes referred to as the Kerr Magneto-Optical effect.

In these embodiments, third laser light 583 (FIG. 5B) comprises a linear polarized laser beam, which when reflected off of a vertically magnetized magneto-optical recording surface, will have its polarization partially rotated. An elliptic polarization is created in the reflected laser beam 584 (FIG. 5B), with the axis of the ellipse depending on the polarity of the magnetization of the recording surface of the magneto-optic media. Thus, as the vertical magnetic polarity of the M/O recording surface changes between North and South, the axis of the ellipse in the reflected laser beam shifts back and forth. It is this shift in the axis of the ellipse which is detected by the optical detector 490.

Information is erased by reversing the magnet to repel while the laser heats the same portion of the disk, thus making the disk re-writeable. A write-once (WORM) variant of M/O also exists. WORM M/O media is formatted at the factory with a code that informs the drive not to erase data already written to the disk. The media is otherwise identical to rewriteable media so even WORM M/O is physically rewriteable.

Yet a different type of writeable optical medium utilizes a phase-change material to record information. Phase-change media has a polymer substrate that changes from crystalline (shiny) to amorphous (dull) when hit by laser light 582. WORM phase-change media changes only once. Re-writeable phase-change media is chemically different and is formulated to change from shiny to dull and back again. Phase-change is simpler than M/O, requiring no magnet. Re-writeable phase-change is also faster since the new data is written in one pass over the disk, whereas M/O disks erase the data prior to writing new data.

Yet another type of optical media comprises two thin films of metals which meld together when heated by a write laser. The meld material has a different reflectivity than the thin film facing the laser.

Figure 5B:
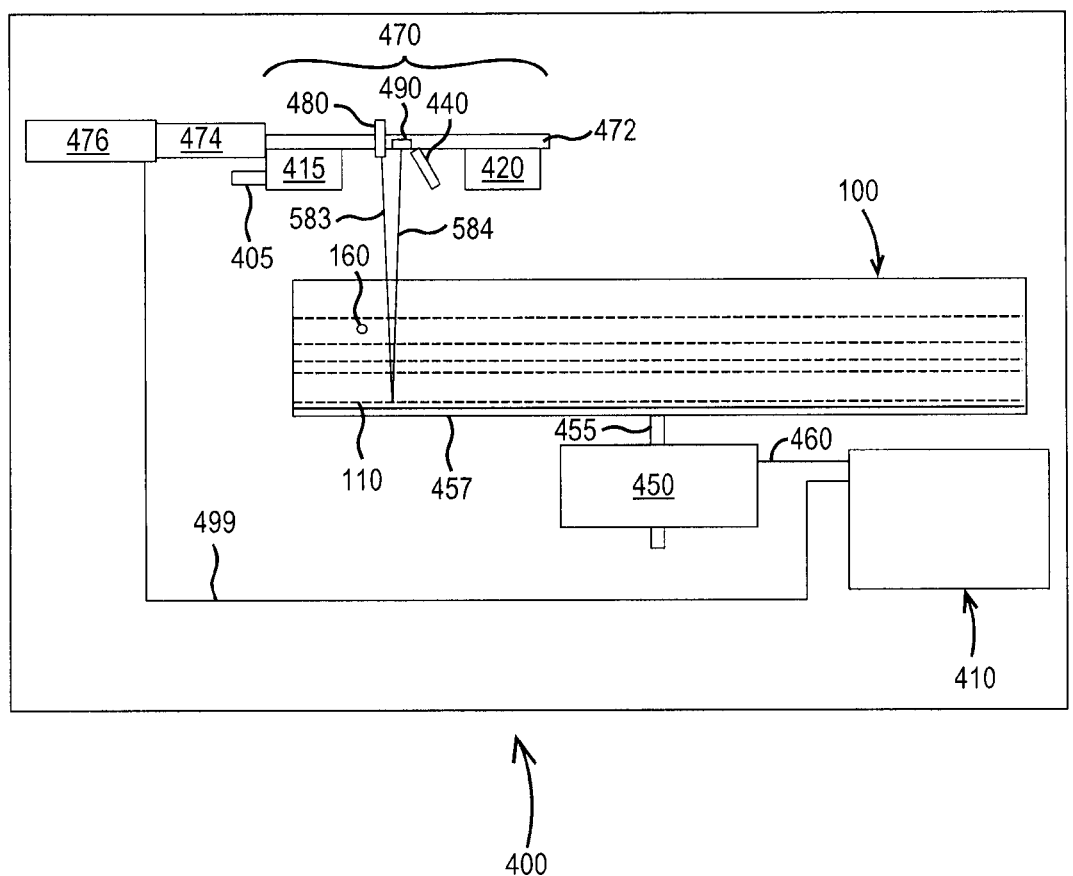
FIG. 5B is a block diagram showing the optical head of FIG. 3 using a second lasing device to read information encoded in the optical data storage layer of Applicants' optical and holographic data storage medium.
Figure 6:
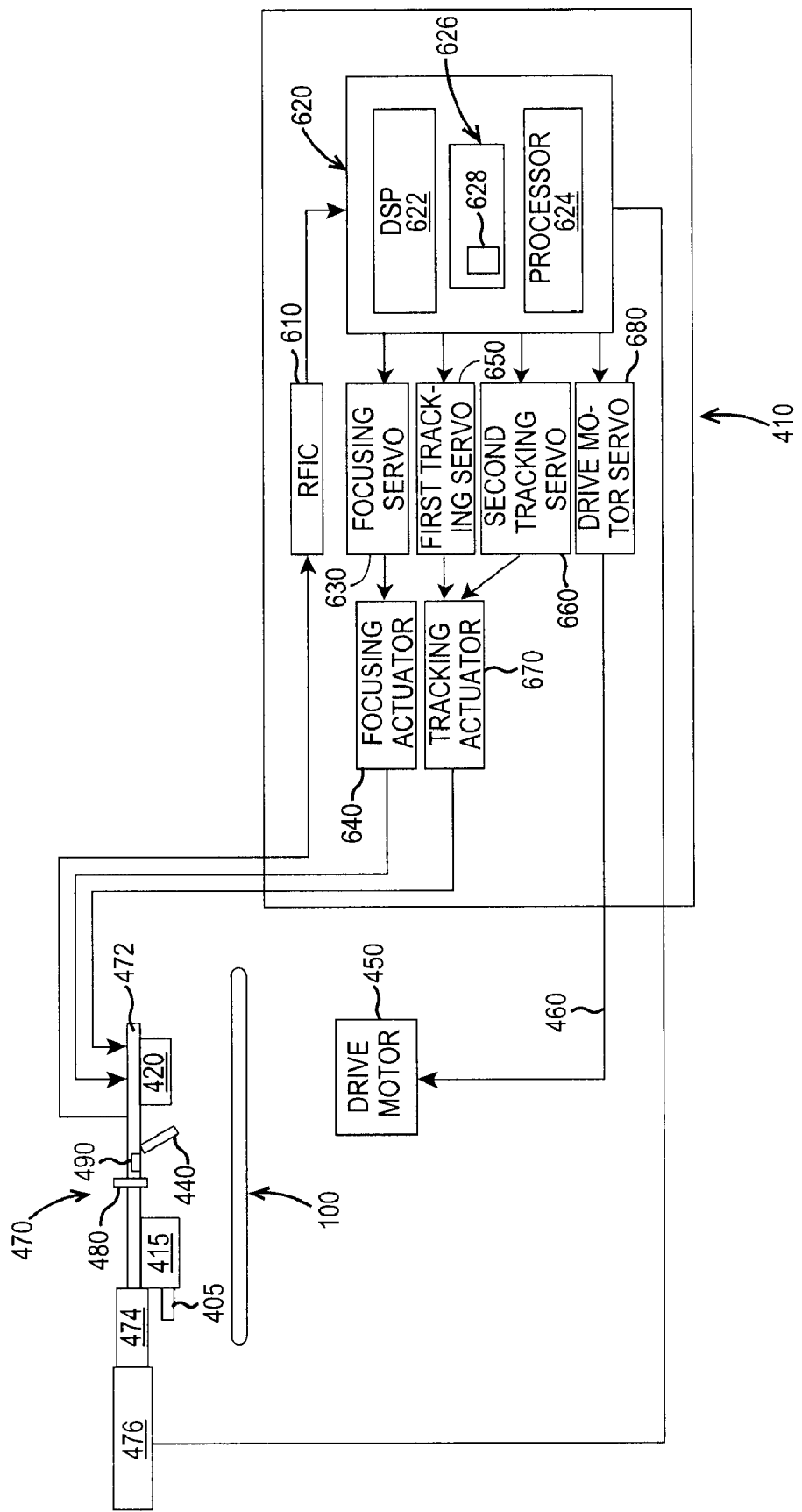
FIG. 6 illustrates a drive controller disposed in Applicants' optical and holographic data drive.

Referring now to FIG. 5B, Applicants' optical holographic data drive 400 (FIGS. 3, 4, 5A, 5B, 7) utilizes second lasing device 480 and third laser light 583 to read information from optical data storage layer 110 (FIG. 2A) or 240 (FIG. 2B). Third laser light comprises the same wavelength as second laser light 582, wherein second laser light 582 comprises greater power than third laser light 583.

Second lasing device 480, using third laser light 583, scans optical data storage layer 110 (FIG. 2A) or 240 (FIG. 2B). Dichronic mirror layer 130 (FIGS. 2A, 2B) is transparent to the third laser light 583 provided by second lasing device 480, and that third laser light 583 passes through dichronic mirror layer 130 and strikes optical data storage layer 110 (FIG. 2A) or 240 (FIG. 2B). Drive controller 410 (FIGS. 3, 4, 5A, 5B, 6) causes optical head 470 to move along one or more of the three orthogonal axes, and as optical head 470 moves the third laser light 583 incident on optical data storage layer 110 (FIG. 2A) is selectively reflected backwardly as reflected third laser light 584. The three orthogonal axes are typically radial, tangential, and vertical, and comprise a cylindrical coordinate system (R, θ, Z). The radial direction is typically associated with optical head 470 seeking across data storage medium 100, and the vertical direction is often associated with focusing the light from lasing devices 405 and 480, and the spin axis of media 100. Wobbly lands 220a-d and wobbly grooves 230a-d are typically disposed along the tangential θ axis. Sensor 490 detects both the presence or absence of reflected third laser light 584.

FIG. 7 illustrates one embodiment of Applicants' data storage and retrieval system 700. In the illustrated embodiment of FIG. 7, data storage and retrieval system 700 communicates with computing devices 710, 720, and 730. In the illustrated embodiment of FIG. 7, computing devices 710, 720, and 730 communicate with storage controller 760 through a data communication fabric 740. In certain embodiments, fabric 740 comprises one or more data switches 750. Further in the illustrated embodiment of FIG. 7, storage controller 760 communicates with one or more holographic data storage systems. In the illustrated embodiment of FIG. 7, data storage and retrieval system 700 further comprises one or more optical holographic drives 400 (FIGS. 3, 4, 5A, 5B, 7).

In certain embodiments, computing devices 710, 720, and 730, are selected from the group consisting of an application server, a web server, a work station, a host computer, or other like device from which information is likely to originate. In certain embodiments, one or more of computing devices 710, 720, and/or 730 are interconnected with fabric 740 using Small Computer Systems Interface ("SCSI") protocol running over a Fibre Channel ("FC") physical layer. In other embodiments, the connections between computing devices 710, 720, and 730, comprise other protocols, such as Infiniband, Ethernet, Gigabit Ethernet, Fibre Channel over Ethernet, or Internet SCSI ("iSCSI"). In certain embodiments, switches 750 are configured to route traffic from the computing devices 710, 720, and/or 730, directly to the storage controller 760.

In the illustrated embodiment of FIG. 7, storage controller 760 comprises a data controller 762, memory 763, microcode 822 and instructions 824 encoded in memory 763, processor 764, and data caches 766, 767, and 768, wherein these components communicate through a data bus 765. In certain embodiments, memory 763 comprises a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

In certain embodiments, the storage controller 760 is configured to read data signals from and write data signals to a serial data bus on one or more of the computing devices 710, 720, and/or 730. Alternatively, in other embodiments the storage controller 760 is configured to read data signals from and write data signals to one or more of the computing devices 710, 720, and/or 730, through the data bus 765 and the fabric 740.

Figure 8:
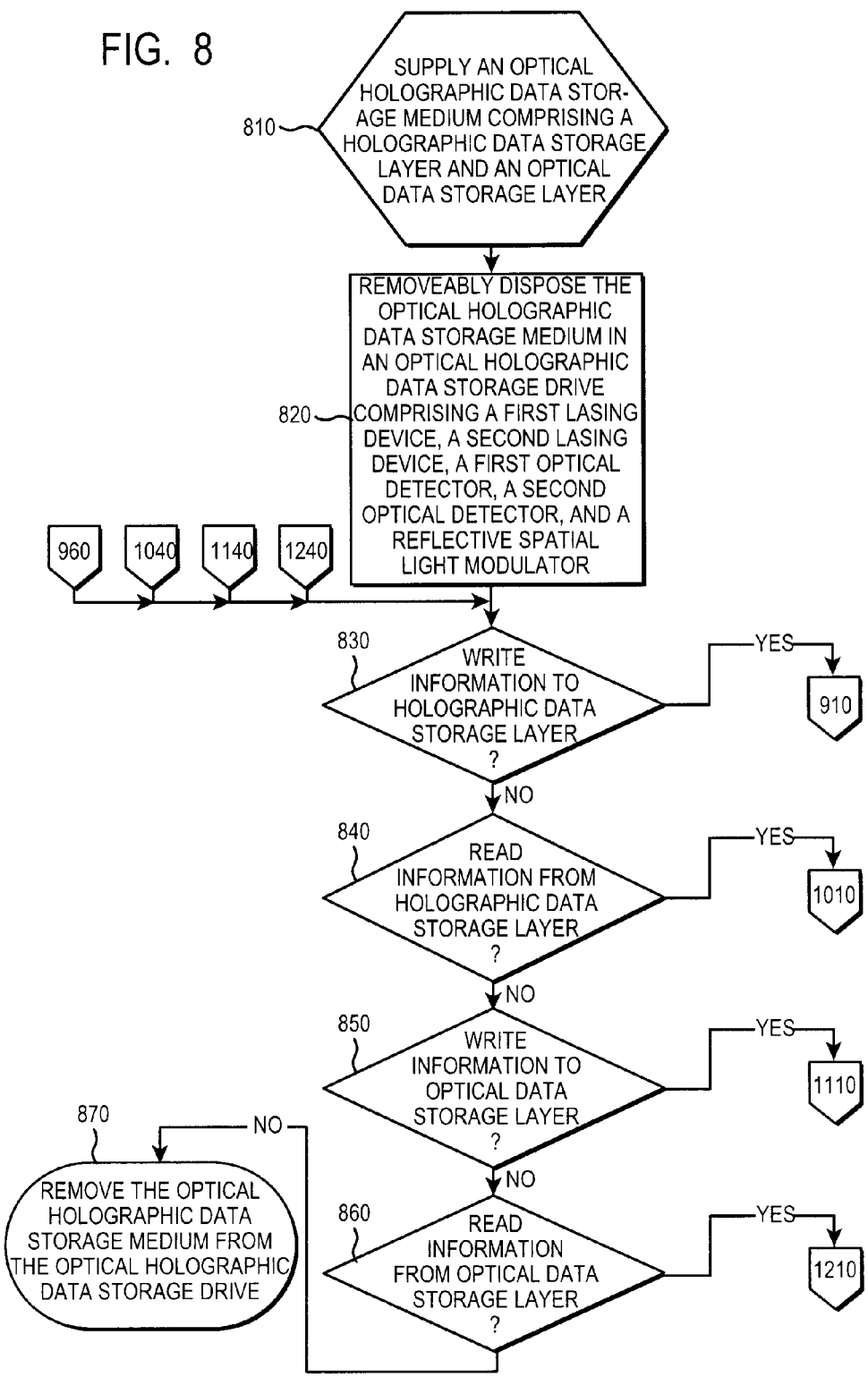
FIG. 8 is a flow chart summarizing the initial steps of Applicants' method to store and retrieve information using Applicants' optical holographic data storage medium and Applicants' optical holographic data storage drive.

Applicants' invention comprises a method to store and/or retrieve information from holographic data storage layer 150 (FIGS. 2A, 2B), and/or optical data storage layer 110 (FIG. 2A) or 240 (FIG. 2B), disposed in Applicants' optical holographic data storage medium 100 (FIGS. 1, 2A, 2B, 3, 4, 5A, 5B, 6). FIG. 8 summarizes the steps of Applicants' method.

Referring now to FIG. 8, in step 810 the method supplies an optical holographic data storage medium, such as for example holographic optical data storage medium 100. The holographic optical data storage medium of step 810 comprises a holographic data storage layer and a separate optical data storage layer.

In step 820, the method mounts the optical holographic data storage medium, such as optical data storage medium 100 (FIGS. 1, 2A, 2B, 3, 4, 5A, 5B, 6), into a compatible drive apparatus, such as optical holographic data drive 400 (FIGS. 3, 4, 5A, 5B, 7). In certain embodiments, such a compatible drive apparatus comprises two lasing devices, wherein the first lasing device emits first laser light having a first wavelength, and wherein the second lasing device emits second laser light having a second wavelength, wherein the first wavelength differs from the second wavelength. In certain embodiments, the first wavelength differs from the second wavelength by at least 100 nanometers.

In certain embodiments, the optical holographic data storage medium comprises a dichronic mirror, such as dichronic mirror 130 (FIGS. 2A, 2B), disposed between the holographic data storage layer and the optical data storage layer, wherein dichronic mirror reflects the first laser light but does not reflect the second laser light.

In step 830, the method determines whether to write information to the holographic data storage layer. In certain embodiments, step 830 is performed by a host computer, such as for example one or more of computing devices 710 (FIG. 7), 720 (FIG. 7), and/or 730 (FIG. 7). In certain embodiments, step 830 is performed by a storage controller, such as for example storage controller 760 (FIG. 7). In certain embodiments, step 830 is performed by a drive controller, such as for example drive controller 410 (FIGS. 3, 4, 5A, 5B, 6).

Figure 9:
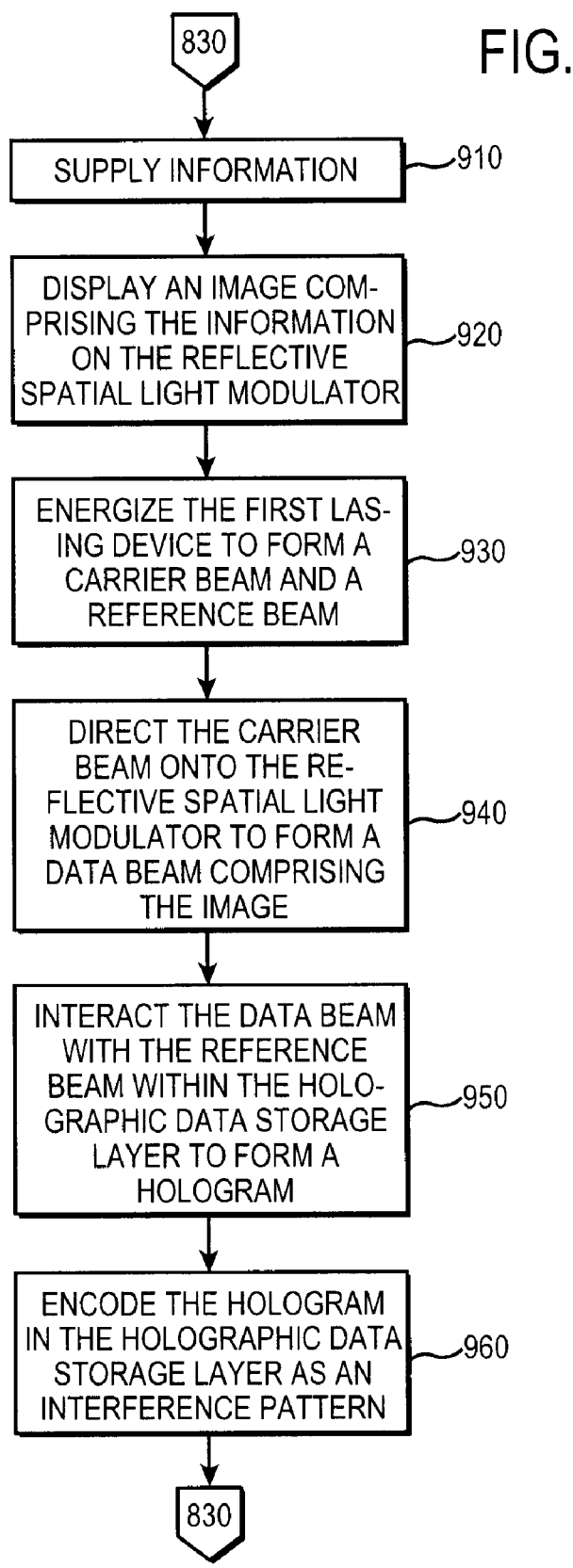
FIG. 9 is a flow chart summarizing additional steps of Applicants' method.

If the method elects in step 830 to write information to the holographic data storage layer portion of the holographic optical data storage medium of step 810, then the method transitions from step 830 to step 910 (FIG. 9). Alternatively, if the method elects not to write information to the holographic data storage layer portion of the holographic optical data storage medium of step 810, then the method transitions from step 830 to step 840 wherein the method determines whether to read information from the holographic data storage layer. In certain embodiments, step 840 is performed by a host computer, such as for example one or more of computing devices 710 (FIG. 7), 720 (FIG. 7), and/or 730 (FIG. 7). In certain embodiments, step 840 is performed by a storage controller, such as for example storage controller 760 (FIG. 7). In certain embodiments, step 840 is performed by a drive controller, such as for example drive controller 410 (FIGS. 3, 4, 5A, 5B, 6).

Figure 10:
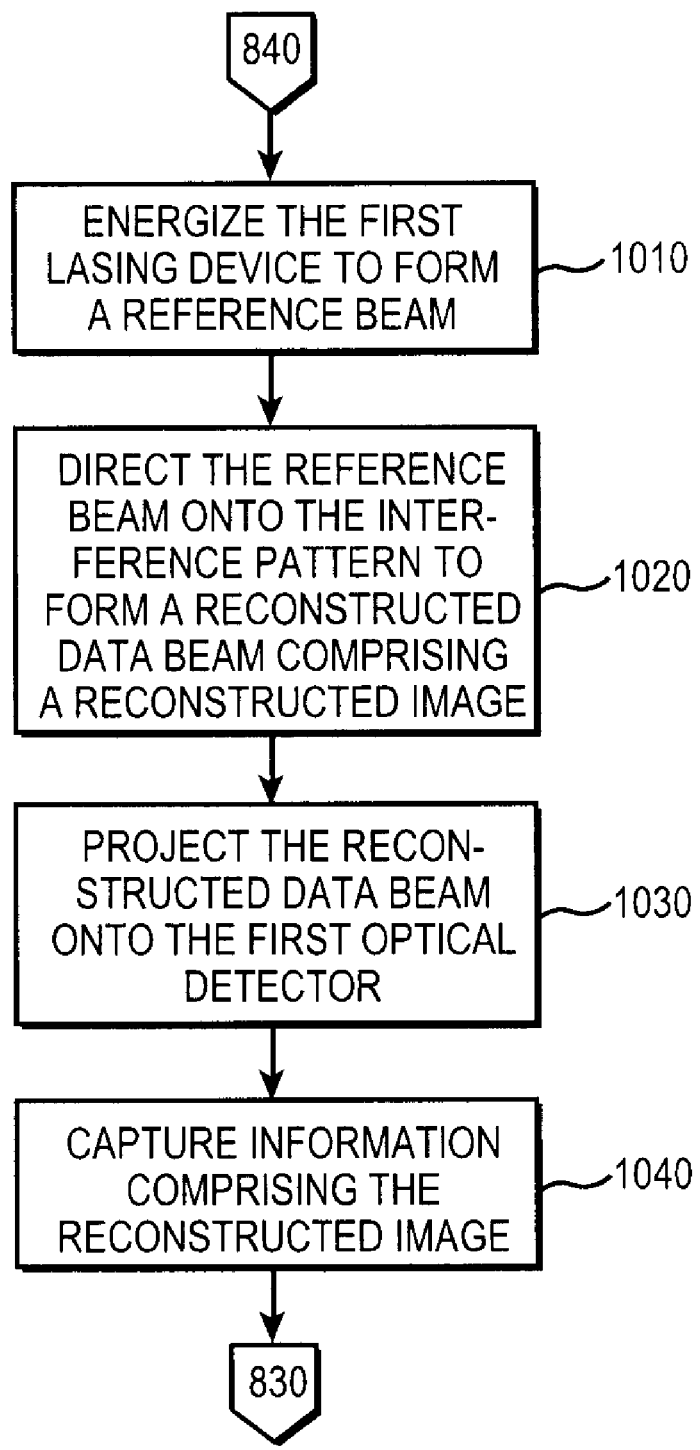
FIG. 10 is a flow chart summarizing additional steps of Applicants' method.

If the method elects in step 840 to read information from the holographic data storage layer portion of the holographic optical data storage medium of step 810, then the method transitions from step 840 to step 1010 (FIG. 10). Alternatively, if the method elects in step 840 not to read information from the holographic data storage layer portion of the holographic optical data storage medium of step 810, then the method transitions from step 840 to step 850 wherein the method determines whether to write information to the optical data storage layer. In certain embodiments, step 850 is performed by a host computer, such as for example one or more of computing devices 710 (FIG. 7), 720 (FIG. 7), and/or 730 (FIG. 7). In certain embodiments, step 850 is performed by a storage controller, such as for example storage controller 760 (FIG. 7). In certain embodiments, step 850 is performed by a drive controller, such as for example drive controller 410 (FIGS. 3, 4, 5A, 5B, 6).

If the method elects in step 850 to write information to the optical data storage layer portion of the holographic optical data storage medium of step 810, then the method transitions from step 850 to step 1110 (FIG. 1). Alternatively, if the method elects not to write information to the optical data storage layer portion of the holographic optical data storage medium of step 810, then the method transitions from step 850 to step 860 wherein the method determines whether to read information from the optical data storage layer. In certain embodiments, step 860 is performed by a host computer, such as for example one or more of computing devices 710 (FIG. 7), 720 (FIG. 7), and/or 730 (FIG. 7). In certain embodiments, step 860 is performed by a storage controller, such as for example storage controller 760 (FIG. 7). In certain embodiments, step 860 is performed by a drive controller, such as for example drive controller 410 (FIGS. 3, 4, 5A, 5B, 6).

If the method elects in step 860 to read information from the optical data storage layer portion of the holographic optical data storage medium of step 810, then the method transitions from step 860 to step 1210 (FIG. 12). Alternatively, if the method elects in step 860 not to read information from the optical data storage layer portion of the holographic optical data storage medium of step 810, then the method transitions from step 860 to step 870 wherein the method removes the optical holographic data storage medium of step 810 from the holographic optical data storage drive of step 820.

FIG. 9 summarizes the steps of Applicants' method to write information to the holographic data storage layer portion of Applicants' holographic optical data storage medium using Applicants' holographic optical data storage drive. Referring now to FIGS. 3 and 9, in step 910 the method supplies information. In certain embodiments, step 910 is performed by a host computer, such as for example one or more of computing devices 710 (FIG. 7), 720 (FIG. 7), and/or 730 (FIG. 7). In certain embodiments, step 910 is performed by a storage controller, such as for example storage controller 760 (FIG. 7). In certain embodiments, step 910 is performed by a drive controller, such as for example drive controller 410 (FIGS. 3, 4, 5A, 5B, 6).

In step 920, the method displays an image comprising information on a reflective spatial light modulator ("RSLM"), such as for example RSLM 440 (FIGS. 3, 4, 5A, 5B). In certain embodiments, step 920 is performed by a host computer, such as for example one or more of computing devices 710 (FIG. 7), 720 (FIG. 7), and/or 730 (FIG. 7). In certain embodiments, step 920 is performed by a storage controller, such as for example storage controller 760 (FIG. 7). In certain embodiments, step 920 is performed by a drive controller, such as for example drive controller 410 (FIGS. 3, 4, 5A, 5B, 6).

In step 930, the method energizes a first lasing device, such as first lasing device 405, disposed in the holographic optical data storage drive of step 820 to form a carrier beam, such as carrier beam 330 (FIG. 3) and a reference beam, such as reference beam 320 (FIG. 3). In certain embodiments, step 930 is performed by a host computer, such as for example one or more of computing devices 710 (FIG. 7), 720 (FIG. 7), and/or 730 (FIG. 7). In certain embodiments, step 930 is performed by a storage controller, such as for example storage controller 760 (FIG. 7). In certain embodiments, step 930 is performed by a drive controller, such as for example drive controller 410 (FIGS. 3, 4, 5A, 5B, 6).

In step 940, the method directs the carrier beam onto the RSLM to form a data beam, such as data beam 340 (FIG. 3) comprising the image of step 910. In certain embodiments, step 940 is performed by a host computer, such as for example one or more of computing devices 710 (FIG. 7), 720 (FIG. 7), and/or 730 (FIG. 7). In certain embodiments, step 940 is performed by a storage controller, such as for example storage controller 760 (FIG. 7). In certain embodiments, step 940 is performed by a drive controller, such as for example drive controller 410 (FIGS. 3, 4, 5A, 5B, 6).

In step 950, the method interacts the data beam of step 940 with the reference beam of step 930 to form a hologram within the holographic data storage layer. In step 960, the method encodes the hologram of step 950 in the holographic data storage layer as an interference pattern, such as interference pattern 160 (FIGS. 3, 4, 5A, 5B). The method transitions from step 960 to step 830 and continues as described herein.

FIG. 10 summarizes the steps of Applicants' method to read information from the holographic data storage layer portion of Applicants' holographic optical data storage medium using Applicants' holographic optical data storage drive. Referring now to FIGS. 4 and 10, in step 1010 the method energizes a first lasing device, such as lasing device 405 to form a reference beam, such as reference beam 430. In certain embodiments, step 1010 is performed by a host computer, such as for example one or more of computing devices 710 (FIG. 7), 720 (FIG. 7), and/or 730 (FIG. 7). In certain embodiments, step 1010 is performed by a storage controller, such as for example storage controller 760 (FIG. 7). In certain embodiments, step 1010 is performed by a drive controller, such as for example drive controller 410 (FIGS. 3, 4, 5A, 5B, 6).

In step 1020, the method directs the reference beam of step 1010 onto an interference pattern encoded in the holographic data storage layer, such as interference pattern 160, to generate a reconstructed data beam comprising a reconstructed image, such as reconstructed data beam 435. In certain embodiments, step 1020 is performed by a host computer, such as for example one or more of computing devices 710 (FIG. 7), 720 (FIG. 7), and/or 730 (FIG. 7). In certain embodiments, step 1020 is performed by a storage controller, such as for example storage controller 760 (FIG. 7). In certain embodiments, step 1020 is performed by a drive controller, such as for example drive controller 410 (FIGS. 3, 4, 5A, 5B, 6).

In step 1030, the method projects the reconstructed data beam of step 1020 onto a first optical detector, such as optical detector 420 (FIGS. 3, 4, 5A, 5B, 6). In step 1040, the method digitally captures information comprising the reconstructed image of step 1020. In certain embodiments, step 1040 is performed by a host computer, such as for example one or more of computing devices 710 (FIG. 7), 720 (FIG. 7), and/or 730 (FIG. 7). In certain embodiments, step 1040 is performed by a storage controller, such as for example storage controller 760 (FIG. 7). In certain embodiments, step 1040 is performed by a drive controller, such as for example drive controller 410 (FIGS. 3, 4, 5A, 5B, 6). The method transitions from step 1040 to step 830 (FIG. 8) and continues as described herein.

Figure 11:
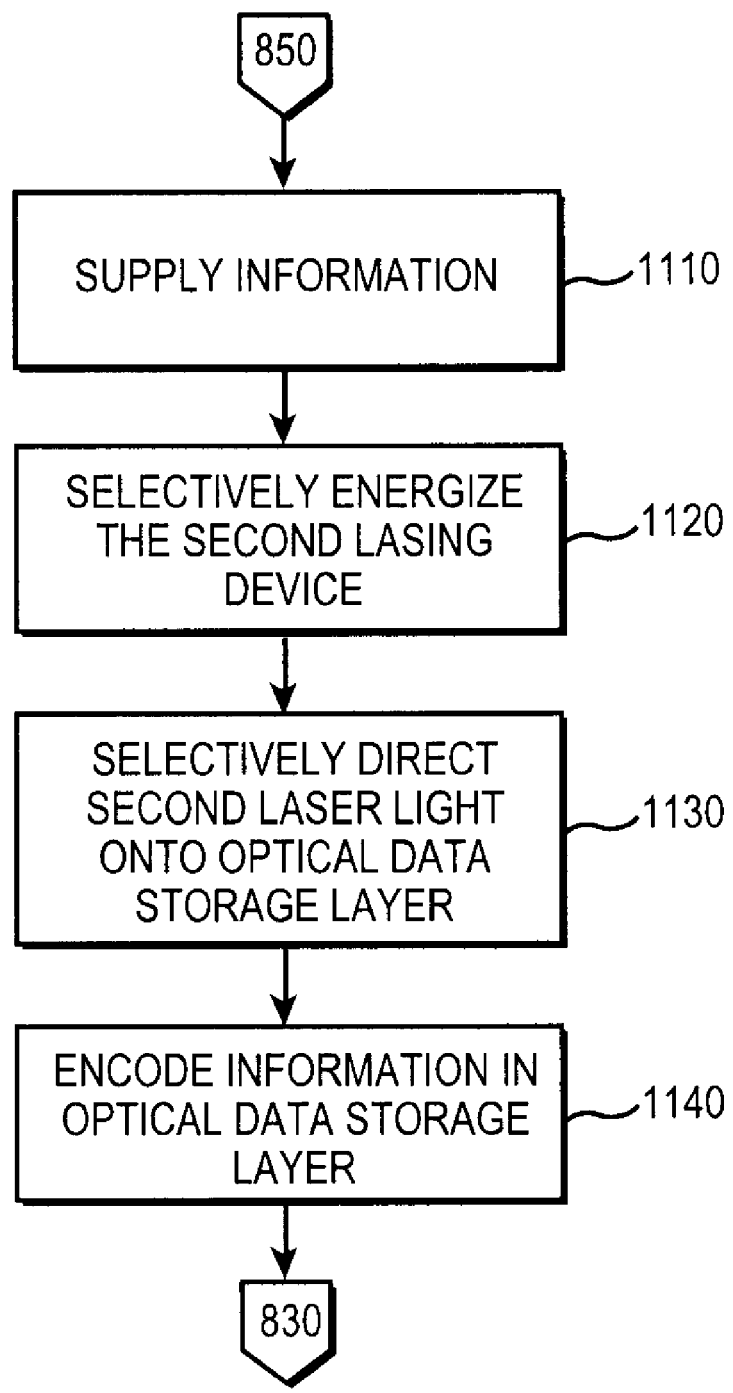
FIG. 11 is a flow chart summarizing additional steps of Applicants' method.

FIG. 11 summarizes the steps of Applicants' method to write information to the optical data storage layer portion of Applicants' holographic optical data storage medium using Applicants' holographic optical data storage drive. Referring now to FIGS. 5A and 11, in step 1110 the method supplies information. In certain embodiments, step 1110 is performed by a host computer, such as for example one or more of computing devices 710 (FIG. 7), 720 (FIG. 7), and/or 730 (FIG. 7). In certain embodiments, step 1110 is performed by a storage controller, such as for example storage controller 760 (FIG. 7). In certain embodiments, step 1110 is performed by a drive controller, such as for example drive controller 410 (FIGS. 3, 4, 5A, 5B, 6).

In step 1120, the method selectively energizes a second lasing device, such as for example lasing device 480 (FIGS. 3, 4, 5A, 5B). In certain embodiments, step 1120 is performed by a host computer, such as for example one or more of computing devices 710 (FIG. 7), 720 (FIG. 7), and/or 730 (FIG. 7). In certain embodiments, step 1120 is performed by a storage controller, such as for example storage controller 760 (FIG. 7). In certain embodiments, step 1120 is performed by a drive controller, such as for example drive controller 410 (FIGS. 3, 4, 5A, 5B, 6).

In step 1130, the method selectively directs second laser light, such as for example laser light 582 (FIG. 5A), onto optical data storage layer 110 (FIG. 2A) or 240 (FIG. 2B). In certain embodiments, step 1130 is performed by a host computer, such as for example one or more of computing devices 710 (FIG. 7), 720 (FIG. 7), and/or 730 (FIG. 7). In certain embodiments, step 1130 is performed by a storage controller, such as for example storage controller 760 (FIG. 7). In certain embodiments, step 1130 is performed by a drive controller, such as for example drive controller 410 (FIGS. 3, 4, 5A, 5B, 6).

In step 1140, the method encodes the information of step 1110 in the optical data storage layer portion of Applicants' holographic optical data storage medium. Applicants' method transitions from step 1140 to step 830 and continues as described herein.

FIG. 12 summarizes the steps of Applicants' method to read information from the optical data storage layer portion of Applicants' holographic optical data storage medium using Applicants' holographic optical data storage drive. Referring now to FIGS. 5B and 12, in step 1210 the method energizes a second lasing device, such as lasing device 480, to form laser light 583 (FIG. 5B). In certain embodiments, step 1210 is performed by a host computer, such as for example one or more of computing devices 710 (FIG. 7), 720 (FIG. 7), and/or 730 (FIG. 7). In certain embodiments, step 1210 is performed by a storage controller, such as for example storage controller 760 (FIG. 7). In certain embodiments, step 1210 is performed by a drive controller, such as for example drive controller 410 (FIGS. 3, 4, 5A, 5B, 6).

In step 1220, the method directs the laser light of step 1210 onto the optical data storage layer portion of the holographic optical data storage medium of step 810 (FIG. 8). In certain embodiments, step 1220 is performed by a host computer, such as for example one or more of computing devices 710 (FIG. 7), 720 (FIG. 7), and/or 730 (FIG. 7). In certain embodiments, step 1220 is performed by a storage controller, such as for example storage controller 760 (FIG. 7). In certain embodiments, step 1220 is performed by a drive controller, such as for example drive controller 410 (FIGS. 3, 4, 5A, 5B, 6).

In step 1230, the method detects selectively reflected laser light, such as reflected laser light 584 (FIG. 5B), using a second optical detector, such as for example optical detector 490 (FIGS. 3, 4, 5A, 5B, 6). In certain embodiments, step 1230 is performed by a host computer, such as for example one or more of computing devices 710 (FIG. 7), 720 (FIG. 7), and/or 730 (FIG. 7). In certain embodiments, step 1230 is performed by a storage controller, such as for example storage controller 760 (FIG. 7). In certain embodiments, step 1230 is performed by a drive controller, such as for example drive controller 410 (FIGS. 3, 4, 5A, 5B, 6).

In step 1240, the method decodes selectively reflected laser light to generate all of part of the information encoded in the optical data storage layer. The method transitions from step 1240 to step 830 (FIG. 8) and continues as described herein.

In certain embodiments, step 1240 is performed by a host computer, such as for example one or more of computing devices 710 (FIG. 7), 720 (FIG. 7), and/or 730 (FIG. 7). In certain embodiments, step 1240 is performed by a storage controller, such as for example storage controller 760 (FIG. 7). In certain embodiments, step 1240 is performed by a drive controller, such as for example drive controller 410 (FIGS. 3, 4, 5A, 5B, 6).

In certain embodiments, individual steps recited in FIGS. 8, 9, 10, 11, and/or 12, may be combined, eliminated, or reordered.

In certain embodiments, Applicants' invention includes instructions, such as instructions 628 (FIG. 6), encoded in memory 626 (FIG. 6) and/or instructions 824 (FIG. 7), encoded in memory 763 (FIG. 7), where those instructions are executed by a processor, such as processor 624 (FIG. 6) and/or processor 764 (FIG. 7), to perform one or more of steps 830, 840, 850, and/or 860, recited in FIG. 8, and/or one or more of steps 90, 920, 930, 940, 950, and/or 960, recited in FIG. 9, and/or one or more of steps 1010, 1020, and/or 1040, recited in FIG. 10, and/or one or more of steps 1110, 1120, 1130, and/or 1140, recited in FIG. 11, and/or one or more of steps 1210, 1220, 1230, and/or 1240, recited in FIG. 12.

In certain embodiments, Applicants' invention includes instructions residing in any other computer program product, where those instructions are executed by a computer external to, or internal to optical holographic data drive 400 (FIGS. 3, 4, 5A, 5B, 7), and/or data storage and retrieval system 700 (FIG. 7), to perform one or more of steps 830, 840, 850, and/or 860, recited in FIG. 8, and/or one or more of steps 90, 920, 930, 940, 950, and/or 960, recited in FIG. 9, and/or one or more of steps 1010, 1020, and/or 1040, recited in FIG. 10, and/or one or more of steps 1110, 1120, 1130, and/or 1140, recited in FIG. 11, and/or one or more of steps 1210, 1220, 1230, and/or 1240, recited in FIG. 12. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to store and retrieve information using an optical holographic data storage medium comprising a holographic data storage layer and an optical data storage layer, comprising the steps of:

disposing said optical holographic data storage medium in an optical holographic data storage drive comprising a reflective spatial light modulator, a first lasing device for emitting first laser light comprising a first wavelength, a first optical detector for detecting first laser light, a second lasing device for emitting second laser light comprising a first power and a second wavelength and third laser light comprising a second power and said second wavelength, and a second optical detector for detecting second laser light;

determining whether to write information to said holographic data storage layer;

determining whether to read information from said holographic data storage layer;

determining whether to write information to said optical data storage layer; and determining whether to read information from said optical data storage layer.

2. The method of claim 1, further comprising the steps of:
receiving information;
displaying an image comprising said information on said reflective spatial light modulator;
directing a carrier beam comprising said first laser light onto said reflective spatial light modulator to form a reflected data beam comprising said image;
interfering said reflected data beam within said holographic data storage layer with a reference beam comprising said first laser light to form a hologram;
encoding said image into said holographic data storage layer as an interference pattern.

3. The method of claim 1, further comprising the steps of:
directing said first laser light onto an interference pattern encoded in said holographic data storage layer, wherein said interference pattern was formed using a hologram comprising an image comprising information;
generating a reconstructed data beam comprising said image;
projecting said reconstructed data beam onto said first optical detector;
capturing said information from said reconstructed data beam.

4. The method of claim 1, further comprising the steps of:
receiving information;
selectively directing said second laser light onto said optical data storage layer;
encoding said information in said optical data storage layer.

5. The method of claim 1, wherein said optical data storage layer comprises encoded information, further comprising the steps of:
directing said third laser light onto said optical data storage layer;
detecting reflected third laser light using said second optical detector;
decoding said information using said reflected third laser light.

6. An article of manufacture comprising a processor, a reflective spatial light modulator, a first lasing device for emitting first laser light comprising a first wavelength, a first optical detector for detecting first laser light, a second lasing device for emitting second laser light comprising a first power and a second wavelength and third laser light comprising a second power and said second wavelength, and a second optical detector for detecting second laser light, and a computer readable medium having computer readable program code disposed therein to decode information from an optical holographic data storage medium comprising a holographic data storage layer and an optical data storage layer, wherein said laser light is not reflected by said holographic data storage layer, the computer readable program code comprising a series of computer readable program steps to effect:

determining whether to write information to said holographic data storage layer;

determining whether to read information from said holographic data storage layer;

determining whether to write information to said optical data storage layer; and determining whether to read information from said optical data storage layer.

7. The article of manufacture of claim 6, said computer readable program code further comprising a series of computer readable program steps to effect:
receiving information;
displaying an image comprising said information on said reflective spatial light modulator;
directing a carrier beam comprising said first laser light onto said spatial light modulator to form a reflected data beam comprising said image;
interfering said reflected data beam within said holographic data storage layer with a reference beam comprising said first laser light to form a hologram;
encoding said image into said holographic data storage layer as an interference pattern.

8. The article of manufacture of claim 6, said computer readable program code further comprising a series of computer readable program steps to effect:
directing said first laser light onto an interference pattern encoded in said holographic data storage layer, wherein said interference pattern was formed from a hologram comprising an image comprising information;
generating a reconstructed data beam comprising said image;
projecting said reconstructed data beam onto said first optical detector;
capturing said information from said reconstructed data beam.

9. The article of manufacture of claim 6, said computer readable program code further comprising a series of computer readable program steps to effect:
receiving information;
selectively directing said second laser light onto said optical data storage layer to encode said information in said optical data storage layer.

10. The article of manufacture of claim 6, wherein said optical data storage layer comprises encoded information, said computer readable program code further comprising a series of computer readable program steps to effect:
directing said third laser light onto said optical data storage layer;
detecting reflected third laser light using said second optical detector;
decoding said information using said reflected third laser light.

11. A computer program product stored in a non-transitory computer readable medium, said computer program product being useable to decode information from an optical holographic data storage medium comprising a holographic data storage layer and an optical data storage layer, using an optical holographic data storage drive comprising a processor, a reflective spatial light modulator, a first lasing device for emitting first laser light comprising a first wavelength, a first optical detector for detecting first laser light, a second lasing device for emitting second laser light comprising a first power and a second wavelength and third laser light comprising second power and said second wavelength, and a second optical detector for detecting second laser light, comprising:

computer readable program code which causes said programmable computer processor to determine whether to write information to said holographic data storage layer;

computer readable program code which causes said programmable computer processor to determine whether to read information from said holographic data storage layer;

computer readable program code which causes said programmable computer processor to determine whether to write information to said optical data storage layer; and computer readable program code which causes said programmable computer processor to determine whether to read information from said optical data storage layer.

12. The computer program product of claim 11, further comprising:

computer readable program code which causes said programmable computer processor to receive information;

computer readable program code which causes said programmable computer processor to display an image comprising said information on said reflective spatial light modulator;

computer readable program code which causes said programmable computer processor to generate a carrier beam comprising said first laser light, wherein said carrier beam is directed onto said spatial light modulator to form a reflected data beam comprising said image;

computer readable program code which causes said programmable computer processor to generate a reference beam, wherein said reference beam interferes with said reflected data beam within said holographic data storage layer to form a hologram which is encoded into said holographic data storage layer as an interference pattern.

13. The computer program product of claim 11, further comprising:

computer readable program code which causes said programmable computer processor to direct said first laser light onto an interference pattern encoded in said holographic data storage layer to generate a reconstructed data beam comprising an image, wherein said reconstructed data beam is projected said first optical detector, and wherein said interference pattern was formed using a hologram comprising an image comprising information;

computer readable program code which causes said programmable computer processor to capture said information from said reconstructed data beam.

14. The computer program product of claim 11, further comprising:

computer readable program code which causes said programmable computer processor to receive information;

computer readable program code which causes said programmable computer processor to selectively direct said second laser light onto said optical data storage layer thereby encoding said information in said optical data storage layer.

15. The computer program product of claim 11, wherein said optical data storage layer comprises encoded information, further comprising:

computer readable program code which causes said programmable computer processor to generate third laser light, wherein said third laser light is directed onto said optical data storage layer;

computer readable program code which causes said programmable computer processor to detect reflected third laser light using said second optical detector;

computer readable program code which causes said programmable computer processor to decode said information using said reflected third laser light.

* * * * *